US012631887B2

(12) United States Patent
Okada et al.

(10) Patent No.: US 12,631,887 B2
(45) Date of Patent: May 19, 2026

(54) OPTICAL APPARATUS

(71) Applicant: FURUKAWA ELECTRIC CO., LTD., Tokyo (JP)

(72) Inventors: Ayato Okada, Tokyo (JP); Yuta Ishige, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 223 days.

(21) Appl. No.: 18/365,588

(22) Filed: Aug. 4, 2023

(65) Prior Publication Data

US 2024/0019709 A1    Jan. 18, 2024

Related U.S. Application Data

(63) Continuation of application No. PCT/JP2022/004432, filed on Feb. 4, 2022.

(30) Foreign Application Priority Data

Feb. 5, 2021    (JP) ................................. 2021-017604

(51) Int. Cl.
*G02B 27/14*          (2006.01)
*G02B 27/10*          (2006.01)

(52) U.S. Cl.
CPC ....... *G02B 27/144* (2013.01); *G02B 27/1006* (2013.01)

(58) Field of Classification Search
CPC .......................... G02B 27/144; G02B 27/1006
USPC ........................................................ 359/629
See application file for complete search history.

(56) References Cited

U.S. PATENT DOCUMENTS

| | | | |
|---|---|---|---|
| 2005/0225627 A1 | 10/2005 | Kuribayashi |
| 2007/0253050 A1 | 11/2007 | Kuribayashi |
| 2007/0296802 A1 | 12/2007 | Kuribayashi |
| 2009/0190196 A1 | 7/2009 | Zaghloul et al. |

(Continued)

FOREIGN PATENT DOCUMENTS

| | | |
|---|---|---|
| CN | 106848812 A | 6/2017 |
| JP | 7-248534 A | 9/1995 |

(Continued)

OTHER PUBLICATIONS

Japanese Office Action issued Nov. 19, 2024, in Japanese Patent Application No. 2021-017604 (with unedited computer-generated English translation). 10 pages.

(Continued)

*Primary Examiner* — Bumsuk Won
*Assistant Examiner* — Mitchell T Oestreich
(74) *Attorney, Agent, or Firm* — Oblon, McClelland, Maier & Neustadt, L.L.P.

(57)          ABSTRACT

An optical apparatus includes: at least one optical component configured to reflect first light that travels in a first direction toward a second direction, transmit second light that travels in the second direction, and generate leaked light traveling in the first direction, the leaked light including a first component transmitted in the first direction in the first light and a second component reflected toward the first direction in the second light; a first processing unit configured to absorb the leaked light, and reflect the leaked light in a predetermined direction; and at least one second processing unit configured to absorb the leaked light coming from the first processing unit.

17 Claims, 8 Drawing Sheets

(56)        References Cited

U.S. PATENT DOCUMENTS

| 2009/0191996 | A1 | | 7/2009 | D'Aluisio |
| 2016/0181762 | A1 | * | 6/2016 | Dawson .................. G02B 6/42 |
| | | | | 372/6 |
| 2019/0020178 | A1 | | 1/2019 | Oguri et al. |

FOREIGN PATENT DOCUMENTS

| JP | | 10-197600 | A | 7/1998 |
| JP | | 2001-321978 | A | 11/2001 |
| JP | | 2005-301252 | A | 10/2005 |
| JP | | 2011-248162 | A | 12/2011 |
| JP | | 2020-139985 | A | 9/2020 |
| WO | WO | 2017/134911 | A1 | 8/2017 |
| WO | WO | 2020/217541 | A1 | 10/2020 |

OTHER PUBLICATIONS

Japanese Notice of Reasons for Refusal issued Jun. 25, 2024 in Japanese Application Nol. 2021-017604 with English translation, 6 pgs.

International Search Report issued Apr. 26, 2022 in PCT/JP2022/004432 filed on Feb. 4, 2022, 2 pages.

Chinese Office Action issued Mar. 12, 2026 in Chinese Patent Application No. 202280013110.4 with English machine translation, 13 pages.

* cited by examiner

OPTICAL APPARATUS

This application is a continuation of International Application No. PCT/JP2022/004432, filed on Feb. 4, 2022 which claims the benefit of priority of the prior Japanese Patent Application No. 2021-017604, filed on Feb. 5, 2021, the entire contents of which are incorporated herein by reference.

BACKGROUND

The present disclosure relates to an optical apparatus.

In the related art, an optical apparatus that includes a processing unit for processing stray light (leaked light) that is unneeded light is known (for example, International Publication No. WO/2017/134911).

SUMMARY

In an optical apparatus in which laser light has high power, power of leaked light that is received by a processing unit for the leaked light increases, so that temperature of the processing unit for the leaked light may increase.

There is a need for an improved and novel optical apparatus that has reduced disadvantage and that is able to prevent an increase in temperature in a processing unit for leaked light.

According to one aspect of the present disclosure, there is provided an optical apparatus including: at least one optical component configured to reflect first light that travels in a first direction toward a second direction, transmit second light that travels in the second direction, and generate leaked light traveling in the first direction, the leaked light including a first component transmitted in the first direction in the first light and a second component reflected toward the first direction in the second light; a first processing unit configured to absorb the leaked light, and reflect the leaked light in a predetermined direction; and at least one second processing unit configured to absorb the leaked light coming from the first processing unit.

According to another aspect of the present disclosure, there is provided an optical apparatus including: a first processing unit configured to absorb leaked light that comes from an optical component and that travels in a first direction, and reflect the leaked light in a third direction; and a second processing unit located separately from the first processing unit in the third direction, the second processing unit being configured to absorb the leaked light reflected by the first processing unit.

DETAILED DESCRIPTION

Exemplary embodiments will be disclosed below. Configurations of the embodiments described below and operation and results (effects) achieved by the configurations are one example. The present disclosure may be embodied by configurations other than the configurations disclosed in the embodiments below. Further, according to the present disclosure, it is possible to achieve at least one of various effects (including derivative effects) achieved by the configurations.

The embodiments described below have the same configurations. Therefore, according to the configuration of each of the embodiments described below, it is possible to achieve the same operation and effects based on the same configuration. Furthermore, in the following, the same components are denoted by the same reference symbols, and repeated explanation may be omitted in some cases.

In the present specification, ordinal numbers are assigned, for the sake of convenience, to distinguish components, regions, directions, light, and the like, but do not indicate priority or order.

Furthermore, in each of the drawings, an X direction is indicated by an arrow X, a Y direction is indicated by an arrow Y, and a Z direction is indicated by an arrow Z. The X direction, the Y direction, and the Z direction cross one another and are perpendicular to one another.

Figure 1:
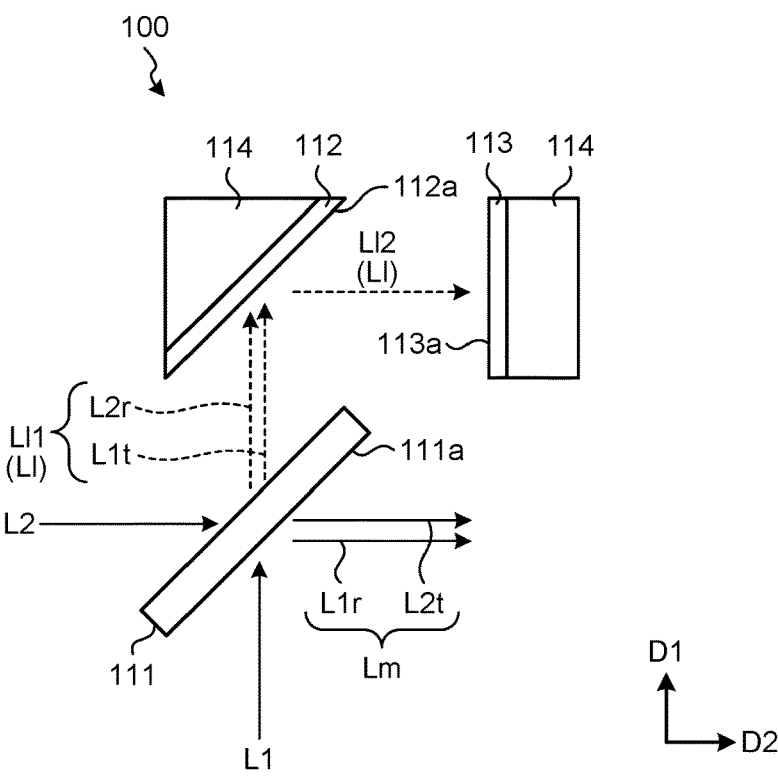
FIG. 1 is an exemplary and schematic plan view of an optical apparatus of a first embodiment.

FIG. 1 is a plan view of an optical apparatus 100 of a first embodiment. As illustrated in FIG. 1, the optical apparatus 100 includes a wavelength filter 111, a first processing unit 112, a second processing unit 113, and heat transmission units 114.

The wavelength filter 111 mainly reflects light L1 that travels in a D1 direction and transmits light L2 that travels in a D2 direction. An incident angle of the light L1 and a reflection angle of reflected light L1$r$ at a reflecting surface 111$a$ are the same. Further, the D1 direction, the D2 direction, and a posture of the wavelength filter 111 are set such that the reflected light L1$r$ and transmitted light L2$t$ travel in the D2 direction. In the configuration as described above, main light Lm that comes from the wavelength filter 111 includes the reflected light L1$r$ of the light L1 and the transmitted light L2$t$ of the light L2. The light L1 is one example of first light and the light L2 is one example of second light. The D1 direction is one example of a first direction and the D2 direction is one example of a second direction. Further, the wavelength filter 111 is one example of an optical component.

The light L1 and the light L2 are, for example, beams of light at different wavelengths. As one example, if the wavelength of the light L1 is longer than the wavelength of the light L2, the wavelength filter 111 is, for example, a short pass filter.

Furthermore, the wavelength of the light L1 may be shorter than the wavelength of the light L2. In this case, the wavelength filter 111 is, for example, a long pass filter.

In the wavelength filter 111, it is difficult to achieve reflection performance of 100% and transmission performance of 100%, and therefore, in reality, transmitted light L1$t$ of the light L1 and reflected light L2$r$ of the light L2 are generated, and these beams of light serve as leaked light L11 (L1) from the wavelength filter 111. In the configuration as described above, both of the transmitted light L1$t$ and the reflected light L2$r$ travel in the D1 direction from the wavelength filter 111. In other words, the leaked light L11 coming from the wavelength filter 111 travels in the D1 direction.

In the optical apparatus 100, the first processing unit 112 and the second processing unit 113 that are arranged in a multistage manner handle the leaked light L1 that comes from the wavelength filter 111. The first processing unit 112 is a processing unit on an anterior stage and absorbs and reflects the leaked light L11. The second processing unit 113 is a processing unit on a posterior stage (last stage) and absorbs leaked light L12 (L1). Each of the first processing unit 112 and the second processing unit 113 converts energy of the leaked light L1 to thermal energy.

The first processing unit 112 reflects the leaked light L1 in a predetermined direction toward the second processing unit 113 without scattering the leaked light L1. Reflection of the leaked light L1 at the first processing unit 112 is not diffuse reflection, but specular reflection. Therefore, for example, it is possible to arrange the second processing unit 113 at a convenient position in the optical apparatus 100, such as a position at which interference with other components does not occur or a position at which a thermal effect is not given to the other components in the optical apparatus 100, for example. Further, if the first processing unit 112 scatters the leaked light L1, the scattered leaked light L1 may travel in an unexpected direction and a disadvantageous situation may occur such that an adhesive that fixes the optical component may be damaged. In this regard, according to the present embodiment, it is possible to reflect the leaked light L1 in the predetermined direction and infallibly handle the leaked light L1 by the first processing unit 112 and the second processing unit 113, so that it is possible to easily avoid a disadvantageous situation due to the leaked light L1.

In the present embodiment, as one example, in the first processing unit 112, an incident angle of the leaked light L11 that enters a reflecting surface 112$a$ and a reflection angle of leaked light L12 that is reflected by the reflecting surface 112$a$ are the same. In the present embodiment, as one example, the leaked light L12 travels in the D2 direction. The D2 direction is one example of a third direction and a predetermined direction.

The second processing unit 113 is located at a position separated from the first processing unit 112 in a traveling direction of the leaked light L12, in the present embodiment, in the D2 direction, and absorbs the leaked light L12 that comes from the first processing unit 112. The second processing unit 113 absorbs most of the leaked light L12, but may scatter or reflect a part of the leaked light L12.

In the present embodiment, the first processing unit 112 does not absorb most of the energy of the leaked light L1, but the first processing unit 112 and the second processing unit 113 are arranged to distribute positions at which the energy of the leaked light L1 is absorbed in the optical apparatus 100. Therefore, it is possible to prevent a local increase of temperature of the optical apparatus 100.

To distribute the portions for absorbing the energy of the leaked light L1 in the optical apparatus 100, reflectivity of the leaked light L1 in the second processing unit 113 is set to lower than reflectivity of the leaked light L1 in the first processing unit 112. Here, the reflectivity of the leaked light L1 in the second processing unit 113 is a ratio of power of leaked light (not illustrated) reflected by the second processing unit 113 to power of the leaked light L12 input to the second processing unit 113, and the reflectivity of the leaked light L1 in the first processing unit 112 is a ratio of power of the leaked light reflected by the first processing unit 112 to power of the leaked light L11 input to the first processing unit 112. Further, it is assumed that each of the first processing unit 112 and the second processing unit 113 does not transmit the leaked light L1.

As one example, the reflectivity of the leaked light L1 in the first processing unit 112 is set to about 50% (about ½), and the reflectivity of the leaked light L1 in the second processing unit 113 is set to about 0%. In this case, the first processing unit 112 absorbs about 50% of the energy of the leaked light L11 that comes from the wavelength filter 111, and the second processing unit 113 absorbs about 50% of the energy of the leaked light L11 that comes from the wavelength filter 111. With the setting as described above, it is possible to absorb the energy of the leaked light L1 at a plurality of portions in a distributed manner and in an approximately equal manner.

However, the setting of the reflectivity in the first processing unit 112 and the second processing unit 113 is not limited to this example. As in the present embodiment, if the single first processing unit 112 and the single second processing unit 113 are arranged, it is preferable to set the reflectivity in the first processing unit 112 to equal to or larger than 30% and equal to or smaller than 70%, and more preferably, equal to or larger than 40% and equal to or smaller than 60%, from the viewpoint of distribution of energy absorbing portions.

Each of the heat transmission units 114 transmits heat that is generated by the first processing unit 112 or the second processing unit 113 to a heat dissipation unit, such as a heat sink (not illustrated). The heat transmission units 114 are made of, for example, a material with high thermal conductivity, such as a metal material. Examples of the material with high thermal conductivity include a copper material such as oxygen-free copper or a copper alloy, and an aluminum material such as pure aluminum or an aluminum alloy. Further, the heat transmission units 114 are arranged so as to protrude from a surface of a base (not illustrated) of the optical apparatus 100. In this case, the heat transmission units may be integrated with the base, or may be constructed by attaching separate members on the surface of the base.

Furthermore, the first processing unit 112 and the second processing unit 113 may be layer portions that are arranged on side surfaces of the heat transmission units 114. As one example, the first processing unit 112 may be configured as a nickel plating layer that is arranged on the heat transmission unit 114 that is made of a copper material, and the second processing unit 113 may be configured as a blackened layer that is arranged on the heat transmission unit 114 that is made of a copper material. The blackened layer is made of, for example, a copper oxide coating, or the like.

Thus, as described above, according to the present embodiment, in the optical apparatus 100, it is possible to handle the leaked light L1 at a plurality of portions in a distributed manner, so that it is possible to prevent generation of a portion in which temperature is locally increased in the optical apparatus 100.

Figure 2:
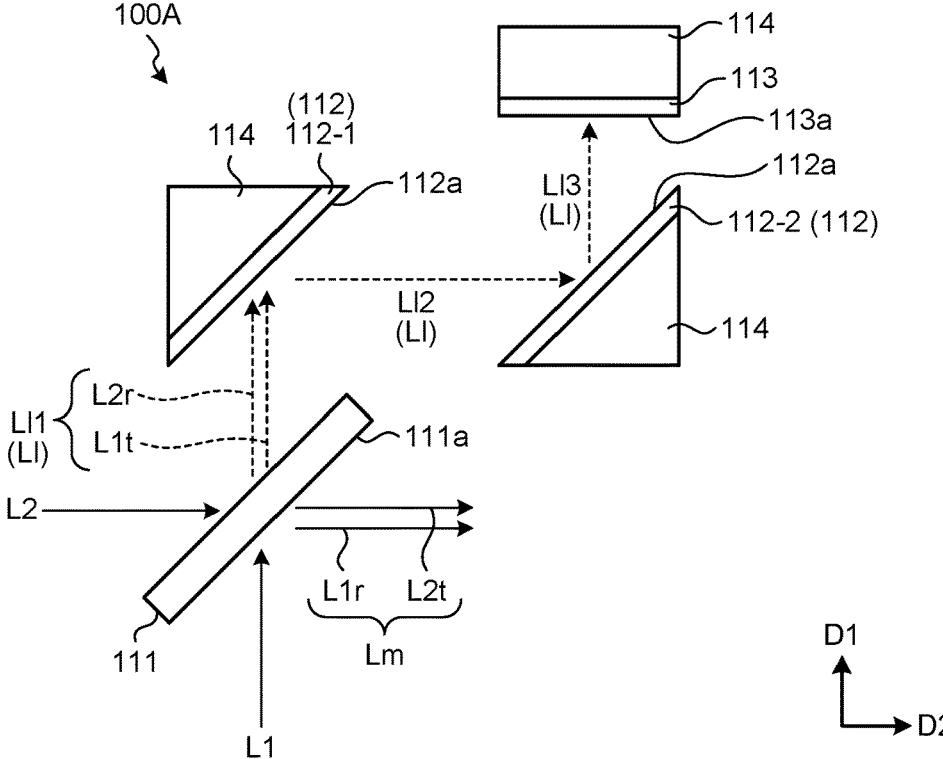
FIG. 2 is an exemplary and schematic plan view of an optical apparatus of a second embodiment.

FIG. 2 is a plan view of an optical apparatus 100A of a second embodiment. As illustrated in FIG. 2, the optical apparatus 100A includes the wavelength filter 111, first processing units 112-1 and 112-2, the second processing unit 113, and the heat transmission units 114. The present embodiment is different from the first embodiment as described above in that the plurality of first processing units 112-1 and 112-2 are arranged in a multistage manner on an anterior stage of the second processing unit 113. The first processing units 112-1 and 112-2 are arranged in series on an optical path of the leaked light L1. Except for the point as described above, the optical apparatus 100A has the same configuration as the optical apparatus 100 of the first embodiment as described above.

The first processing unit 112-1 absorbs the leaked light L11 that comes from the wavelength filter 111, and reflects the leaked light L11 in the D2 direction toward the posterior stage, that is, toward the first processing unit 112-2 on the downstream side in the traveling direction of the optical path of the leaked light L1. Further, the first processing unit 112-2 is located separated from the first processing unit 112-1 in the D2 direction, absorbs the leaked light L12 that comes from the anterior stage, that is, the first processing unit 112-1 on the upstream side in the traveling direction of the optical path of the leaked light L1, and reflects the leaked light L12 in the D1 direction toward the second processing unit 113. The second processing unit 113 absorbs leaked light L13 (L1) that is reflected by the first processing unit 112-2. The first processing units 112-1 and 112-2 have the same configurations as the first processing unit 112 of the first embodiment as described above, and achieve the same operation and effects. Meanwhile, reflection directions of the leaked light L1 at the first processing units 112-1 and 112-2 are not limited to this example. Further, the number of the first processing units 112 may be three or more. Furthermore, the first processing units 112-1 and 112-2 on the plurality of stages may be handled as the single integrated first processing unit 112. In this case, the D1 direction is one example of the third direction.

Moreover, in the present embodiment, reflectivity of the first processing unit 112-2 is set to lower than reflectivity of the first processing unit 112-1, and reflectivity of the second processing unit 113 is set to lower than the reflectivity of the first processing unit 112-2. As one example, the reflectivity of the first processing unit 112-1 is set to, for example, about 66.7% (about ⅔), the reflectivity of the first processing unit 112-2 is set to, for example, about 50% (about ½), and the reflectivity of the second processing unit 113 is set to, for example, about 0%. In this case, the first processing unit 112-1 absorbs about one-third of the energy of the leaked light L11 that comes from the wavelength filter 111, the first processing unit 112-2 absorbs about one-third of the energy of the leaked light L11 that comes from the wavelength filter 111, and the second processing unit 113 absorbs about one-third of the energy of the leaked light L11 that comes from the wavelength filter 111. With the setting as described above, it is possible to absorb the energy of the leaked light L1 at a plurality of portions in a distributed manner and in an approximately equal manner.

Even in the present embodiment, it is possible to prevent generation of a portion in which temperature is locally increased in the optical apparatus 100A. Further, according to the present embodiment, in the optical apparatus 100A, it is possible to handle the leaked light L1 at the increased number of portions in a distributed manner, so that it is possible to further reduce a local temperature difference in the optical apparatus 100A.

Figure 3:
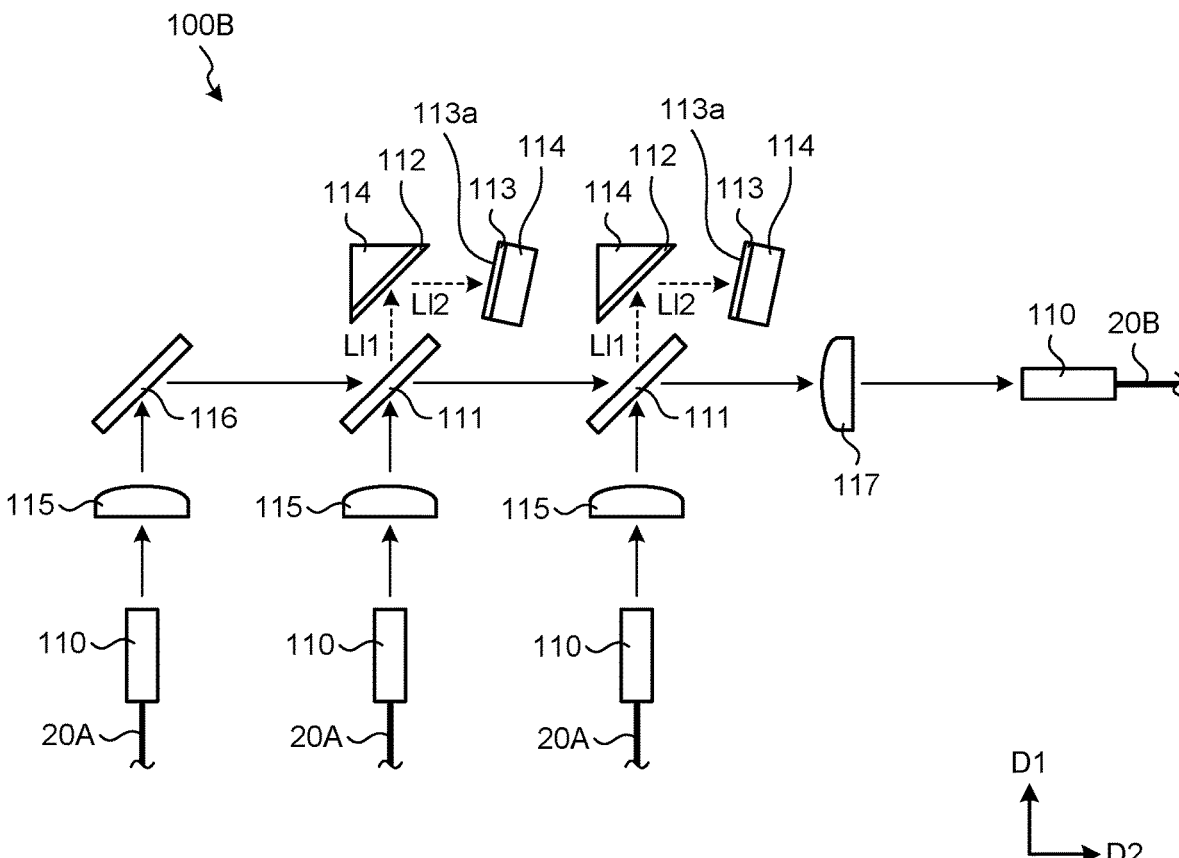
FIG. 3 is an exemplary and schematic plan view of an optical apparatus of a third embodiment.

FIG. 3 is a plan view of an optical apparatus 100B of a third embodiment. As illustrated in FIG. 3, the optical apparatus 100B includes optical components such as lenses 115, a mirror 116, the wavelength filters 111, and a lens 117, synthesizes beams of light that are input from a plurality of optical fibers 20A and that have different wavelengths, and couples the beams of light into an optical fiber 20B. Further, each of the optical fibers 20A and 20B is supported by a support unit 110. The lenses 115 are, for example, collimator lenses, and the lens 117 is, for example, a focusing lens.

Even with the optical apparatus 100B configured as described above, it is possible to achieve the same effects as the first embodiment as described above.

Further, in the present embodiment, normal directions of light receiving surfaces 113a of the second processing units 113 are inclined with respect to an opposite direction of the traveling direction (D2 direction) of the leaked light L12. With this configuration, it is possible to prevent slight reflected light at the light receiving surfaces 113a from returning to the wavelength filters 111 and adversely affecting the main light Lm.

Figure 4:
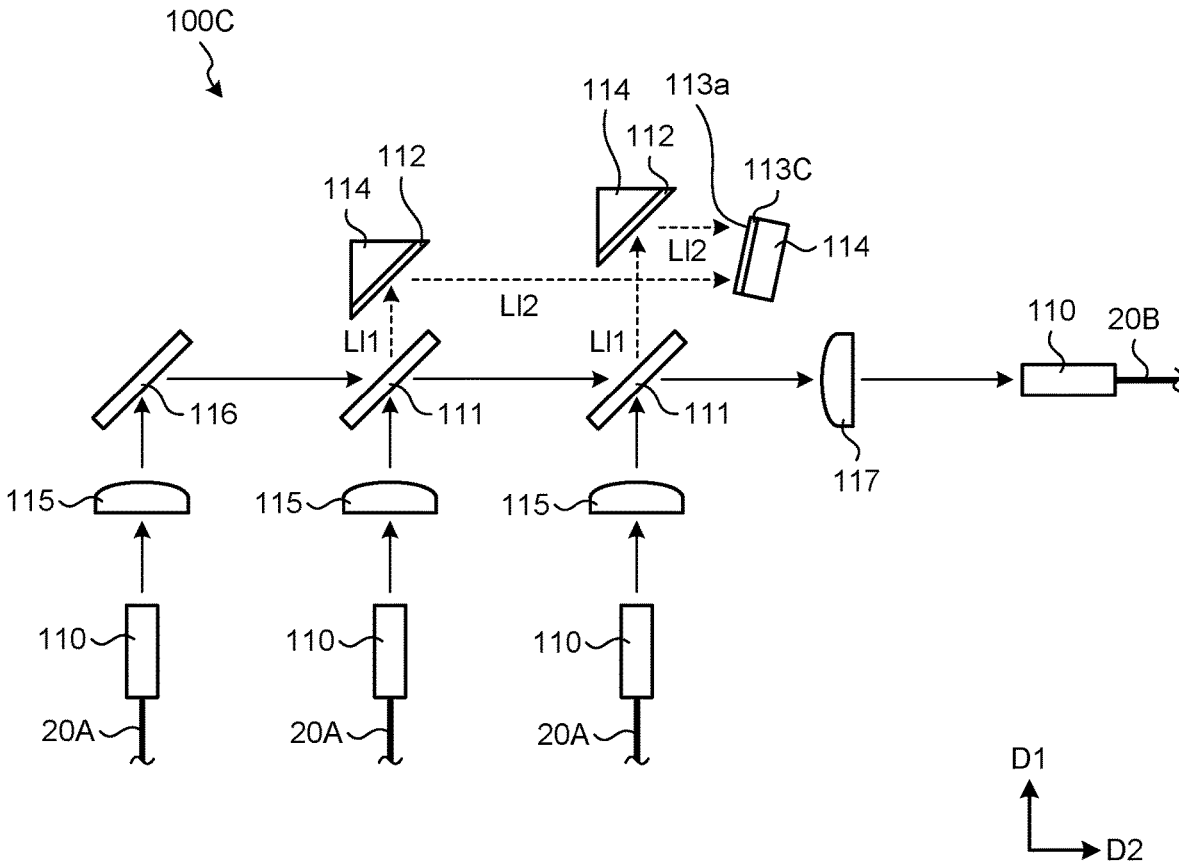
FIG. 4 is an exemplary and schematic plan view of an optical apparatus of a fourth embodiment.

FIG. 4 is a plan view of an optical apparatus 100C of a fourth embodiment. As illustrated in FIG. 4, the optical apparatus 100C is different from the optical apparatus 100B of the third embodiment as described above in terms of including a single second processing unit 113C and not including the two second processing units 113. Except for the point as described above, the optical apparatus 100C of the fourth embodiment has the same configuration as the optical apparatus 100B of the third embodiment.

In the present embodiment, the single second processing unit 113C absorbs the beams of leaked light L12 that are reflected by the two first processing units 112. In other words, the single second processing unit 113C is shared between the two first processing units 112. With this configuration, it is possible to reduce the number of processing units in the optical apparatus 100C, so that, for example, it is possible to improve the degree of freedom of layout of the components in the optical apparatus 100C and it is possible to reduce time and cost for manufacturing due to the reduction in the number of the components, which is an advantage.

Further, in the present embodiment, reflectivity of each of the two first processing units 112 is set to, for example, about 33.3% (about ⅓), and reflectivity of the second processing unit 113 is set to, for example, about 0%. In this case, each of the two first processing units 112-1 absorbs about one-third of total energy of the beams of leaked light L11 that come from the two wavelength filters 111, and the second processing unit 113 absorbs about one-third of the total energy of the beams of leaked light L11 that come from the two wavelength filters 111. With the setting as described above, it is possible to approximately evenly disperse and absorb the energy of the leaked light L1 at a plurality of portions.

Figure 5:
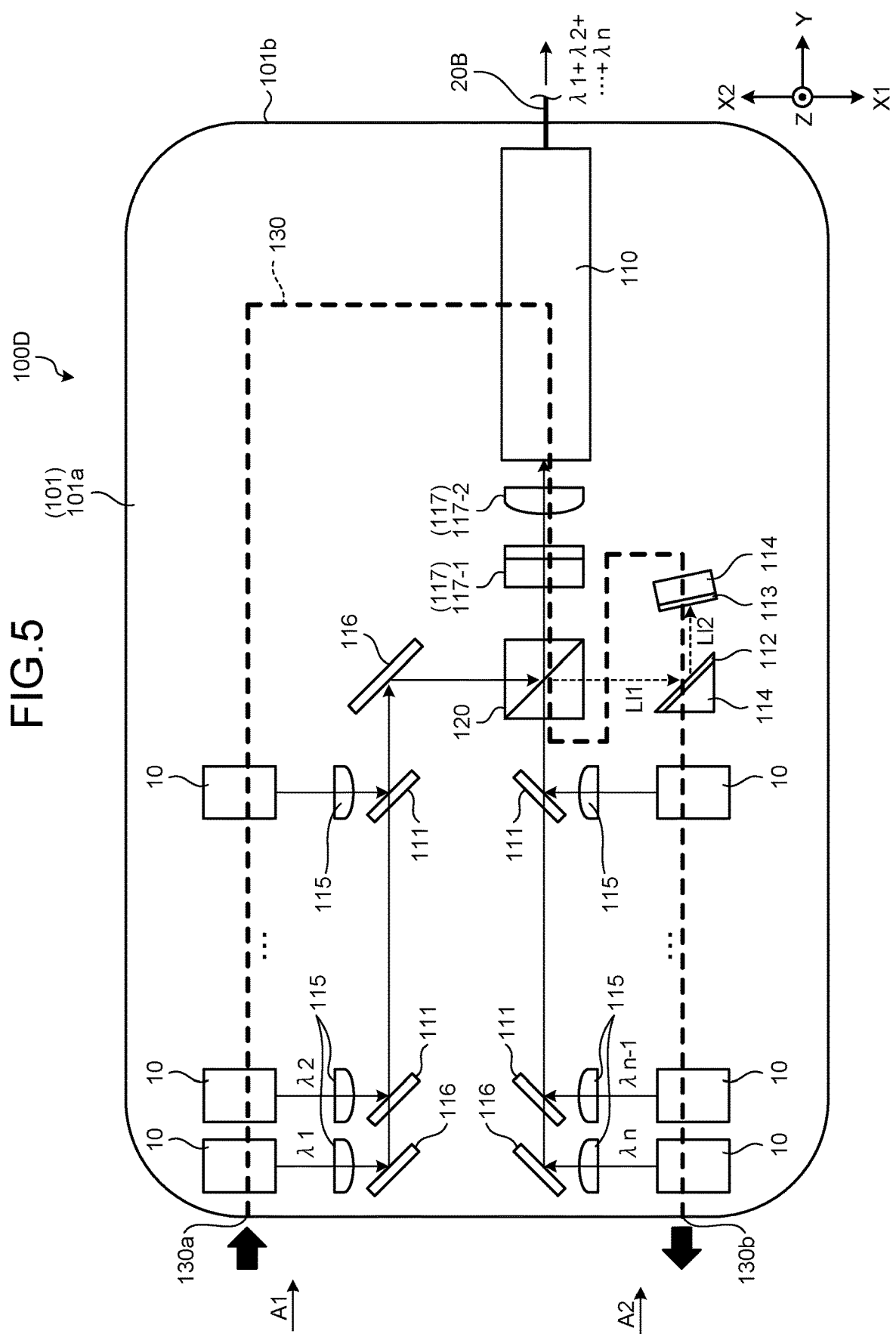
FIG. 5 is an exemplary and schematic plan view of an optical apparatus of a fifth embodiment.

FIG. 5 is a plan view of an optical apparatus 100D of a fifth embodiment. As illustrated in FIG. 5, the optical apparatus 100D includes a housing 101, the optical fiber that is supported by the support unit 110, a plurality of light emitting units 10, and an optical component that synthesizes a plurality of beams of light emitted from the plurality of light emitting units 10. The optical apparatus 100D may also be referred to as a light emitting apparatus.

The housing 101 includes, for example, a case and a cover (not illustrated), and is sealed. The housing 101 is made of, for example, a material with high thermal conductivity, such as a copper material or an aluminum material.

In the present embodiment, two arrays A1 and A2 in each of which the plurality of light emitting units 10 are arranged at predetermined intervals (for example, constant intervals)

in the Y direction are arranged in an approximately parallel manner. The plurality of light emitting units 10 output beams of laser light at different wavelengths ($\lambda$1, $\lambda$2, . . . , $\lambda$n-1, $\lambda$n). As for an interval between the plurality of wavelengths, for example, the interval between center wavelengths is 5 nanometers (nm) to 20 nm. Further, synthetic light generated here may include blue laser light. The light emitting units 10 are, for example, semiconductor laser modules.

Each of the light emitting units 10 includes, in a hermetically sealed case, a submount, a light emitting element that is mounted on the submount, and a collimator lens (not illustrated) that collimates light emitted by the light emitting element in a fast axis direction, for example. The light that has transmitted through the collimator lens is emitted from a window that is arranged in the case. Meanwhile, the light emitting unit 10 may be configured so as not to be hermetically sealed in the case, in other words, the submount, the light emitting element, and the collimator lens may be exposed inside the housing 101.

The beams of light output from the plurality of light emitting units 10 are synthesized by a plurality of optical components. The optical components include lenses 115, the mirror 116, the wavelength filters 111, a combiner 120, the lenses 117 (117-1 and 117-2), and the like.

The lenses 115 collimate light in the Y direction (slow axis direction). The wavelength filters 111 are the same as the wavelength filters 111 of the embodiments as described above.

The combiner 120 synthesizes beams of light that come from the two arrays A1 and A2 and outputs the synthesized light toward the lens 117-1. The lens 117-1 focuses the light in the Z direction (fast axis direction), and the lens 117-2 focuses the light in the X1 direction and the X2 direction (slow axis direction). The combiner 120 may also be referred to as a wavelength synthesis unit.

In the present embodiment, the first processing unit 112 and the second processing unit 113 handle leaked light that come from the combiner 120. The leaked light L11 that comes from the combiner 120 includes a component that has transmitted through the combiner 120 without being reflected by the combiner 120 in the light coming from the array A1, and another component that is reflected by the combiner 120 without transmitting through the combiner 120 in the light coming from the array A2. The first processing unit 112 absorbs and reflects the leaked light L11, and the second processing unit 113 absorbs the leaked light L12 that is reflected by the first processing unit 112. The combiner 120 is one example of the optical component.

Furthermore, in the housing 101, a cooling passage 130 that cools the plurality of light emitting units 10, the support unit 110, the lenses 117-1 and 117-2, the combiner 120, the heat transmission units 114, and the like is arranged. In the cooling passage 130, for example, a refrigerant, such as a coolant, flows. The cooling passage 130 is extended near (just below) a mounting surface of each of the components on the housing 101, and an inner surface of the cooling passage 130 is thermally connected to cooling target components and regions, that is, the light emitting units 10, the support unit 110, the lenses 117-1 and 117-2, the combiner 120, and the heat transmission units 114, for example. Further, the cooling passage 130 is arranged so as to overlap with maximum temperature positions of the cooling target components and the regions in the line of sight in the Z direction. A portion in which the cooling passage 130 is arranged in the housing 101 is one example of a cooling mechanism. Furthermore, the cooling mechanism is also one example of a heat dissipation unit.

Figure 6:
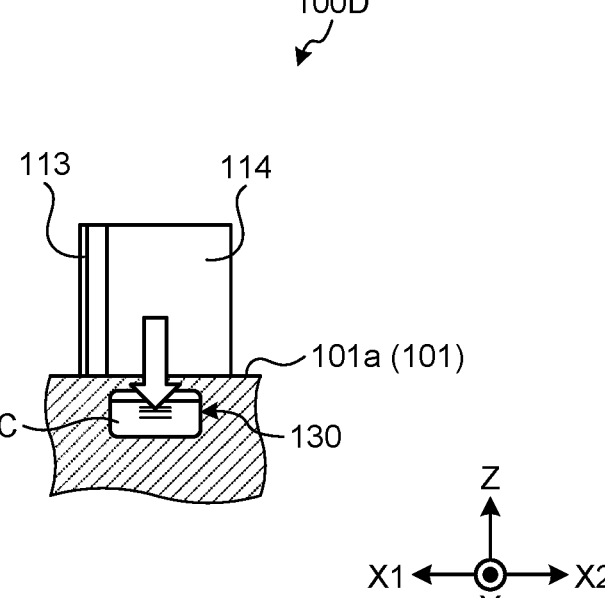
FIG. 6 is an exemplary and schematic partial side view (partial cross-sectional view) of the optical apparatus of the fifth embodiment.

FIG. 6 is a side view (partial cross-sectional view) of the second processing unit 113 and the heat transmission unit 114 of the optical apparatus 100D viewed in the opposite direction of the Y direction. As illustrated in FIG. 6, the heat transmission unit 114 and the second processing unit 113 that protrude from a surface 101a in the Z direction is arranged on the surface 101a of the housing 101. The heat transmission unit 114 is mounted on the surface 101a of the housing 101 by, for example, connection using a fixture, such as a screw, bonding using an adhesive with thermal conductivity, welding, or the like.

Furthermore, the cooling passage 130 in which a refrigerant C flow is arranged in the housing 101 so as to overlap with the heat transmission unit 114 and the second processing unit 113 in the Z direction. The cooling passage 130 is arranged such that, as illustrated in FIG. 5, at least a part of the cooling passage 130 between an inlet 130a and an outlet 130b overlaps the heat transmission units 114 in the Z direction.

In this manner, in the present embodiment, the heat transmission units 114, the inner surface of the cooling passage 130, and the refrigerant C are thermally connected. Therefore, according to the present embodiment, heat exchange is performed between the second processing unit 113 and the refrigerant C via the heat transmission unit 114 and the housing 101, and the second processing unit 113 that has generated heat based on the energy of the leaked light L1 is cooled, so that it is possible to prevent an increase in temperature around the second processing unit 113 and the heat transmission unit 114. Meanwhile, although not illustrated in the drawings, as for the first processing unit 112, the optical apparatus 100D has the same configuration as illustrated in FIG. 6; therefore, heat exchange is performed between the first processing unit 112 and the refrigerant C via the heat transmission unit 114 and the housing 101, the first processing unit 112 that has generated heat based on the energy of the leaked light L1 is cooled, so that it is possible to prevent an increase in temperature around the first processing unit 112 and the heat transmission unit 114.

Figure 7:
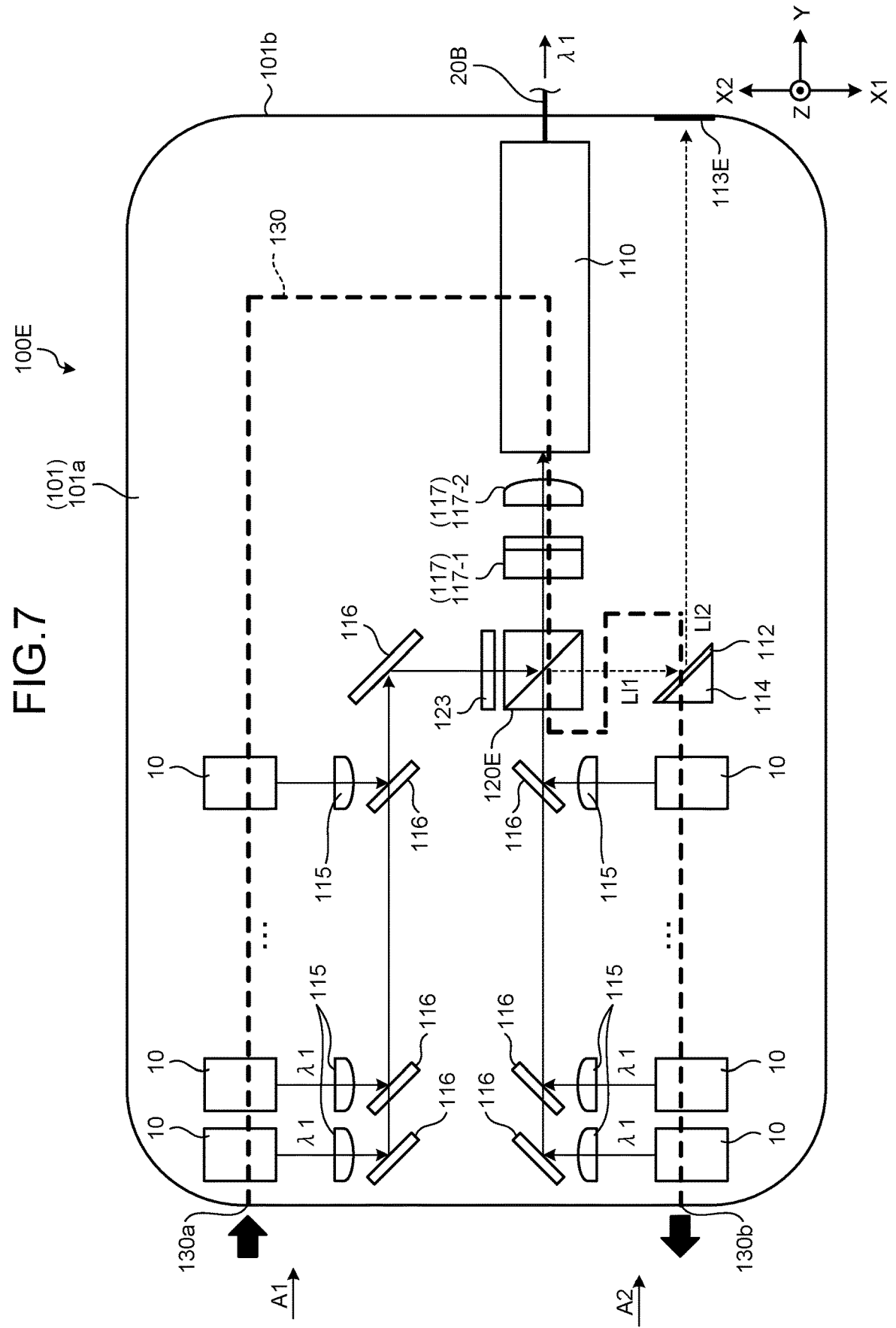
FIG. 7 is an exemplary and schematic plan view of an optical apparatus of a sixth embodiment.

FIG. 7 is a plan view of an optical apparatus 100E of a sixth embodiment. The optical apparatus 100E synthesizes beams of light at the same wavelength $\lambda$1 (the single wavelength $\lambda$1) and outputs the synthesized light.

In the housing 101, stepped surfaces (not illustrated) are arranged in each of the arrays A1 and A2, in which the plurality of light emitting units 10 are arranged at predetermined intervals (for example, regular intervals) in the Y direction, such that positions of the light emitting units 10 deviate in the Z direction along the opposite direction of the Y direction. Each of the light emitting units 10 is mounted on each of the stepped surfaces.

Each of the light emitting units 10 outputs light at the same wavelength $\lambda$1. The light emitting units 10 are, for example, semiconductor laser modules.

Beams of light output from the plurality of light emitting units 10 are synthesized by a plurality of optical components. The optical components include the lenses 115, the mirrors 116, a combiner 120E, the lenses 117 (117-1 and 117-2), and the like.

The mirrors 116 are arranged on the respective stepped surfaces on the housing 101, similarly to the light emitting units 10. Each of the mirrors 116 reflects light that comes from the optically-coupled light emitting unit 10. A position of each of the stepped surfaces in the Z direction and a size of each of the mirrors 116 are set so as to prevent interference with light that comes from the different mirror 116.

Light that comes from the array A1 is input to the combiner 120E via a half wave plate 123 that rotates a plane of polarization of the light, and light that comes from the array A2 is input to the combiner 120 without via the half wave plate 123. The combiner 120E may also be referred to as a polarization combining unit.

Even in the present embodiment, the first processing unit 112 and a second processing unit 113E handle leaked light that comes from the combiner 120E. The leaked light L11 that comes from the combiner 120E includes a component that has transmitted through the combiner 120E without being reflected by the combiner 120E in the light coming from the array A1, and another component that is reflected by the combiner 120E without transmitting through the combiner 120E in the light coming from the array A2. The first processing unit 112 absorbs and reflects the leaked light L11, and the second processing unit 113E absorbs the leaked light L12 that is reflected by the first processing unit 112. The combiner 120E is one example of the optical component.

Further, in the present embodiment, the second processing unit 113E is arranged on an inner surface of a side wall 101b of the housing 101. With this configuration, it is possible to use the side wall 101b as a support unit of the second processing unit 113E and as a heat transmission unit corresponding to the second processing unit 113E. With this configuration, it is possible to reduce the number of processing units in the optical apparatus 100E, so that it is possible to, for example, improve a degree of freedom of layout of the components in the optical apparatus 100E and it is possible to reduce time and cost for manufacturing due to the reduction in the number of the components, which is an advantage. Meanwhile, the second processing unit 113E may absorb and scatter the leaked light L12.

Figure 8:
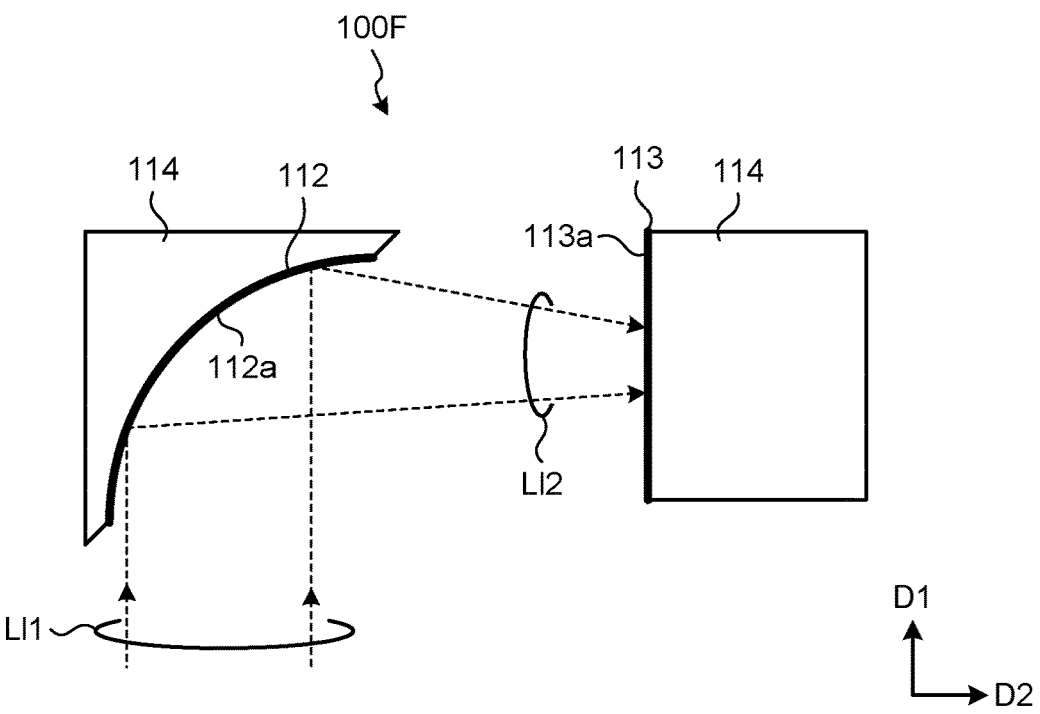
FIG. 8 is an exemplary and schematic plan view of an optical apparatus of a seventh embodiment.

FIG. 8 is a plan view of an optical apparatus 100F of a seventh embodiment. As illustrated in FIG. 8, in the present embodiment, the reflecting surface 112a of the first processing unit 112 is a concave surface. In this case, the leaked light L12 travels in the D2 direction while converging. With this configuration, for example, it is possible to reduce the sizes of the second processing unit 113 and the heat transmission unit 114, which is an advantage.

Figure 9:
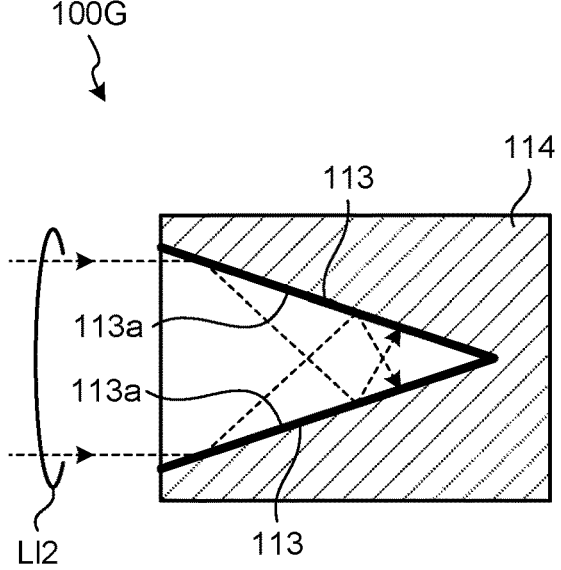
FIG. 9 is an exemplary and schematic cross-sectional view of a second processing unit and a heat transmission unit that are included in an optical apparatus of an eighth embodiment.

FIG. 9 is a cross-sectional view of the second processing unit 113 and the heat transmission unit 114 that are included in an optical apparatus 100G of an eighth embodiment. As illustrated in FIG. 9, in the present embodiment, the second processing unit 113 and the light receiving surfaces 113a have conical cone shapes in which diameters are reduced in the D2 direction. Further, the light receiving surfaces 113a also function as reflecting surfaces, and the leaked light L12 is multiply reflected by the light receiving surfaces 113a. Therefore, it is possible to further improve an absorption rate of the leaked light L12 in the second processing unit 113. With this configuration, for example, it is possible to prevent leakage of the leaked light L12 in a casing, so that it is possible to more easily avoid a disadvantageous situation due to the leaked light L12, which is an advantage.

Figure 10:
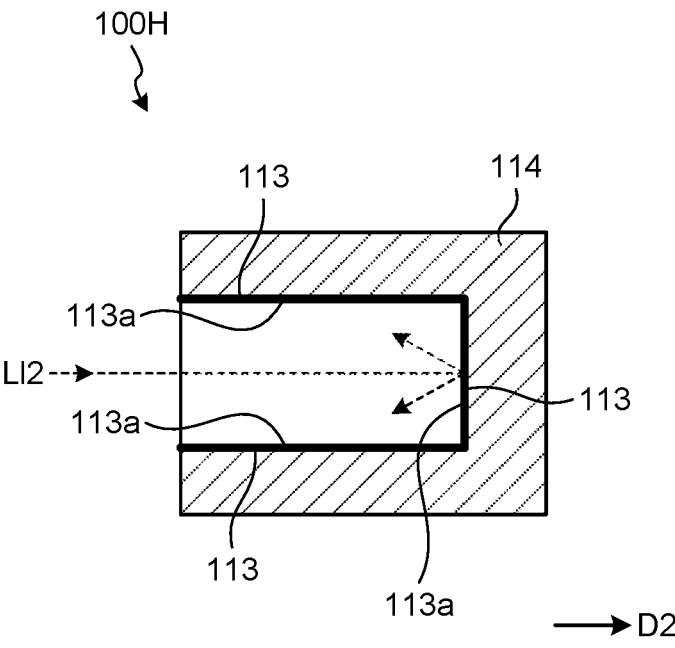
FIG. 10 is an exemplary and schematic cross-sectional view of a second processing unit and a heat transmission unit that are included in an optical apparatus of a ninth embodiment.

FIG. 10 is a cross-sectional view of the second processing unit 113 and the heat transmission unit 114 that are included in an optical apparatus 100H of a ninth embodiment. As illustrated in FIG. 10, in the present embodiment, the second processing unit 113 and the light receiving surfaces 113a have bottomed cylindrical shapes that are opened in an opposite direction of the D2 direction. Further, the light receiving surfaces 113a are configured as rough surfaces for which surfaces are made rough, and function as reflecting surfaces that diffusely reflect the leaked light L12, so that the leaked light L12 is multiply reflected by the light receiving surfaces 113a. Therefore, it is possible to further improve the absorption rate of the leaked light L12 in the second processing unit 113. With this configuration, for example, it is possible to prevent leakage of the leaked light L12 in the casing, so that it is possible to more easily avoid a disadvantageous situation due to the leaked light L12.

Thus, the embodiments have been described above, but the embodiments as described above are mere examples, and do not limit the scope of the disclosure. The embodiments as described above may be embodied in various different forms, and various omission, replacement, combination, and modifications may be made without departing from the gist of the disclosure. Furthermore, specifications of each of the configurations and shapes (structures, types, directions, models, sizes, lengths, widths, thicknesses, heights, numbers, arrangement, positions, materials, or the like) may be changed appropriately.

According to the present disclosure, for example, it is possible to achieve an improved and novel optical apparatus that has reduced disadvantage, and that is able to prevent an increase in temperature in a processing unit for leaked light Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical apparatus comprising:
at least one optical component configured to:
    reflect first light that travels in a first direction toward a second direction,
    transmit second light that travels in the second direction, and
    generate leaked light traveling in the first direction, the leaked light including a first component transmitted in the first direction in the first light and a second component reflected toward the first direction in the second light;
a first processing unit configured to:
    absorb the leaked light, and
    reflect the leaked light in a predetermined direction; and
at least one second processing unit configured to absorb the leaked light coming from the first processing unit, wherein the first processing unit includes a plurality of third processing units arranged in series on an optical path of the leaked light.

2. The optical apparatus according to claim 1, wherein reflectivity of the leaked light in the second processing unit is lower than reflectivity of the leaked light in the first processing unit.

3. The optical apparatus according to claim 1, wherein reflectivity of the leaked light in one of the plurality of third processing units located on a downstream side in a traveling direction of the optical path of the leaked light between two third processing units included in the plurality of third processing units is lower than reflectivity of the leaked light in another one of the plurality of third processing units located on an upstream side in the traveling direction between the two third processing units.

4. The optical apparatus according to claim 1, further comprising:
a heat transmission unit configured to transmit heat generated by one of the first processing unit and the second processing unit by absorption of the leaked light.

11

12

5. The optical apparatus according to claim 1, further comprising:

a cooling mechanism configured to cool at least one of the first processing unit and the second processing unit.

6. The optical apparatus according to claim 1, wherein the optical apparatus includes a plurality of optical components, the first processing unit includes a plurality of third processing units configured to receive input of the leaked light from the different optical components, and at least one of the second processing units is configured to receive input of the leaked light from the plurality of third processing units.

7. The optical apparatus according to claim 1, wherein the first light and the second light are emitted from different light sources.

8. An optical apparatus comprising: at least one optical component configured to reflect first light that travels in a first direction toward a second direction, transmit second light that travels in the second direction, and generate leaked light traveling in the first direction, the leaked light including a first component transmitted in the first direction in the first light and a second component reflected toward the first direction in the second light;

a first processing unit configured to absorb the leaked light, and reflect the leaked light in a predetermined direction; and at least one second processing unit configured to absorb the leaked light coming from the first processing unit, wherein orientations of planes of polarization of the first light and the second light are different.

9. The optical apparatus according to claim 8, wherein reflectivity of the leaked light in the second processing unit is lower than reflectivity of the leaked light in the first processing unit.

10. The optical apparatus according to claim 8, further comprising: a heat transmission unit configured to transmit heat generated by one of the first processing unit and the second processing unit by absorption of the leaked light.

11. The optical apparatus according to claim 8, further comprising: a cooling mechanism configured to cool at least one of the first processing unit and the second processing unit.

12. The optical apparatus according to claim 8, wherein the optical apparatus includes a plurality of optical components, the first processing unit includes a plurality of third processing units configured to receive input of the leaked light from the different optical components, and at least one of the second processing units is configured to receive input of the leaked light from the plurality of third processing units.

13. The optical apparatus according to claim 8, wherein the first light and the second light are emitted from different light sources.

14. An optical apparatus comprising:

a wavelength filter configured to:

reflect first light that travels in a first direction toward a second direction, transmit second light that travels in the second direction, a wavelength of the second light being different from a wavelength of the first light, and generate leaked light traveling in the first direction, the leaked light including a first component transmitted in the first direction in the first light and a second component reflected toward the first direction in the second light;

a first processing unit configured to:

reflect the leaked light in a predetermined direction, and convert the leaked light into heat by absorbing the leaked light; and at least one second processing unit configured to convert the leaked light into heat by absorbing the leaked light coming from the first processing unit, wherein:

the wavelength filter has reflection performance and transmission performance of less than 100%, the wavelength filter is a short pass filter in a case where the wavelength of the first light is longer than wavelength of the second light, the wavelength filter is a long pass filter in a case where the wavelength of the first light is shorter than wavelength of the second light, reflectivity of the leaked light in the first processing unit is 30% or more and 70% or less, reflectivity of the leaked light in the second processing unit is substantially 0%, and the first processing unit and the second processing unit are arranged separately from each other, and each of the first processing unit and the second processing unit includes a heat transmission unit configured to transmit the heat generated by absorption of the leaked light to a heat dissipation unit so as to suppress a local increase of temperature within the optical apparatus.

15. The optical apparatus according to claim 14, further comprising: a cooling mechanism configured to cool at least one of the first processing unit and the second processing unit.

16. The optical apparatus according to claim 14, wherein the optical apparatus includes a plurality of optical components, the first processing unit includes a plurality of third processing units configured to receive input of the leaked light from the different optical components, and at least one of the second processing units is configured to receive input of the leaked light from the plurality of third processing units.

17. The optical apparatus according to claim 14, wherein the first light and the second light are emitted from different light sources.

* * * * *